Nov. 20, 1962 T. W. KALBOW 3,064,339
ASSEMBLING APPARATUS
Filed April 20, 1961 9 Sheets-Sheet 2

FIG. 4

INVENTOR
T. W. KALBOW
BY a.c. Schwarz, Jr.
ATTORNEY

Fig. 6

INVENTOR
T. W. KALBOW
BY A. C. Schwarz, Jr.
ATTORNEY

Nov. 20, 1962 T. W. KALBOW 3,064,339
ASSEMBLING APPARATUS
Filed April 20, 1961 9 Sheets-Sheet 9

INVENTOR
T. W. KALBOW
BY A.C. Schwarz
ATTORNEY

3,064,339

United States Patent Office
Patented Nov. 20, 1962

3,064,339
ASSEMBLING APPARATUS
Theodore W. Kalbow, Chicago, Ill., assignor to Western Electric Company, Incorporated, a corporation of New York
Filed Apr. 20, 1961, Ser. No. 104,381
9 Claims. (Cl. 29—203)

This invention relates to assembling apparatus, and more particularly to apparatus for assembling bus bars onto perforated panels.

An object of the invention is to provide a novel assembling apparatus.

Another object of the invention is to provide an apparatus for assembling bus bars onto perforated panels.

A further object of the invention is to provide an assembling apparatus having a carrier for supporting an article thereon, and mechanism for indexing the carrier sequentially in opposite directions.

With these and other objects in view, the invention contemplates the provision of a carrier for supporting a perforated panel in a vertical position and for vertical movement and a horizontal gage member for supporting a bus bar level with a row of perforations in the panel, and with tines on the bus bar in alignment with the apertures. A manually operated pusher element is provided to advance the bus bar and move the tines through the apertures in the panel. Movement of the pusher element effects the actuation of a back-up member into engagement with the back of the panel and movement of twisting tools into engagement with short ones of the tines, after which the tools are rotated 90° to twist the tines and lock the bus bar to the panel. Indexing mechanism advances the carrier one step after the assembly of each bus bar to the panel and, on completion of the assembling of all of the bus bars to the panel, two further indexing movements of the carrier condition the indexing mechanism to move the carrier in the opposite direction preparatory to the assembling of bus bars onto another panel.

Other objects, advantages and novel aspects of the invention will become apparent upon consideration of the following detailed description, in conjunction with the accompanying drawings, in which.

Figures 1, 2:
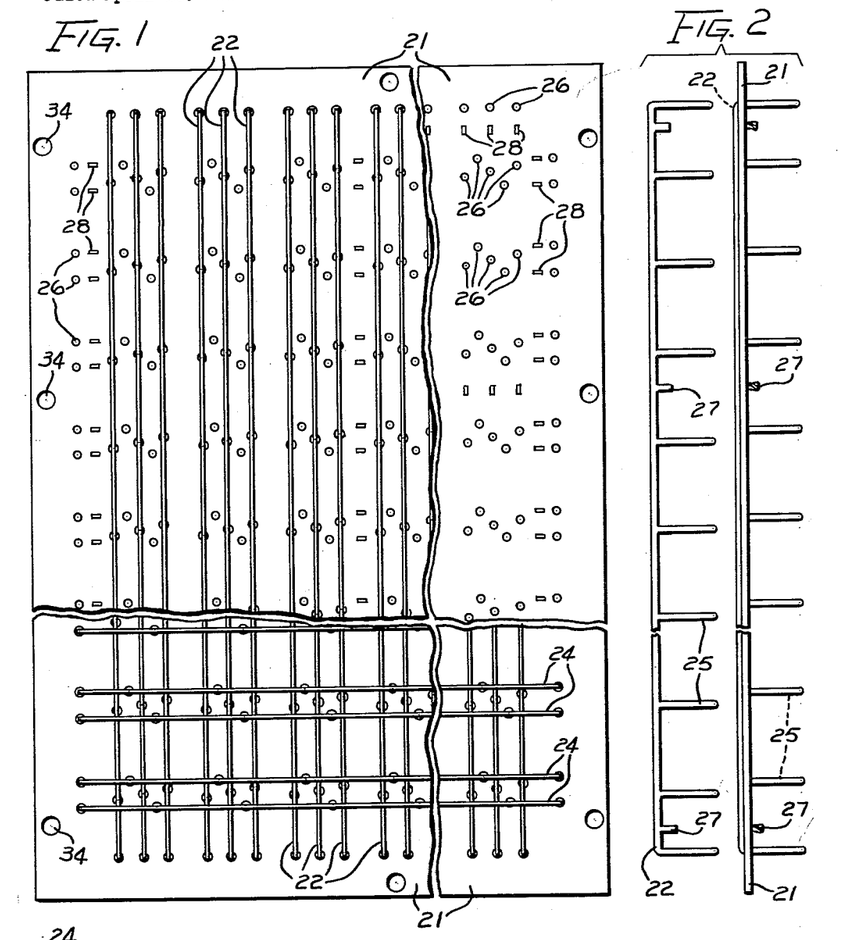
FIG. 1 is a fragmentary plan view of a perforated panel and bus bars of the type to be assembled in the present apparatus.
FIG. 2 is a fragmentary side view of the panel and one type of bus bar which is to be assembled thereon.
Figure 3:
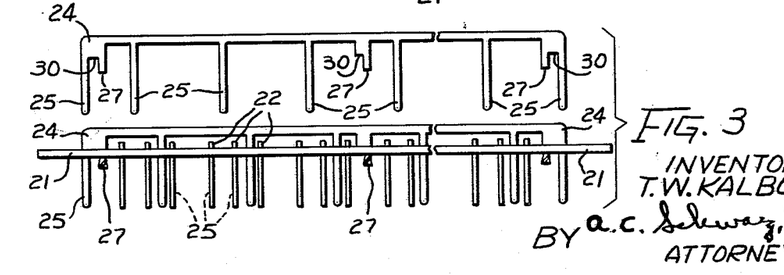
FIG. 3 is an end view of the panel and another type of bus bar to be assembled thereon in a direction at right angles to the first bus bar.

Referring to the drawings, the present apparatus 20 (FIGS. 4 and 5) is designed to assemble onto a perforated panel 21 (FIG. 1) a row of first bus bars 22 in groups of three in one direction on one side of the panel and to assemble a second row of bus bars 24 in groups of two on the same side of the panel and at right angles to and overlapping the first bus bars 22. The first and second bus bars each have a plurality of terminal forming tines 25 which are adapted to extend through apertures 26 in the panel 21 and a plurality of short tines 27 which are adapted to extend through close fitting rectangular apertures 28 in the panel 21 and to be twisted after assembly to secure the bus bars 22 and 24 to the panel. The second bus bars 24 overlie the first bus bars 22 and are provided with spacing shoulders 30 (FIG. 3) to position them in spaced relation to the first bus bars 22 and to the panel 21.

A panel 21 with no bus bars thereon is supported in the apparatus 20 on a bar 32 (FIGS. 4 to 7) having pins 33 (FIGS. 4 and 6) extending through marginal apertures 34 in the panel 21 (FIG. 1). The side edges of the panel are supported in grooves 35 of a pair of vertical bars 36 and 37 (FIGS. 4 to 7 and 9) of a first panel holder 38 located on the right side of the apparatus as shown in FIG. 5. The panel supporting bar 32 is removably supported in seats on the upper ends of the vertical bars 36, 37 of the panel holder 38.

A panel 21 having a row of bus bars 22 assembled thereon is slid into slots 39 of a pair of vertical bars 40 and 41 of a second panel holder 42 (FIGS. 5, 7 and 9) which is positioned to the left of the first panel holder 38 as shown in FIG. 5. The vertical bar 40 is C-shaped in cross section (FIG. 9) and has pins 43 for engaging in the marginal apertures 34 of the panel 21 to support the panel in a predetermined position on the second panel holder. A removable strip 44 is inserted in the slot 39 of the bar 40 to clamp the panel 21 thereto.

Figure 9:
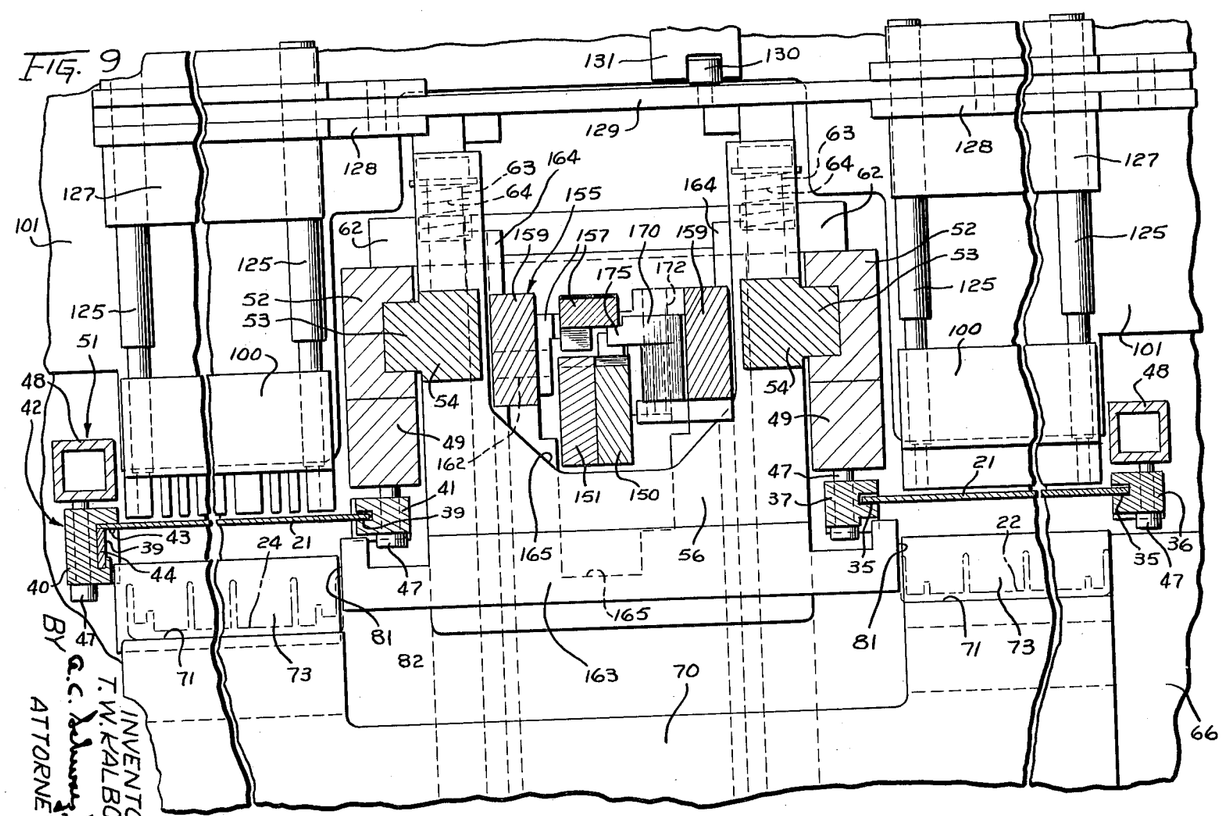
FIG. 9 is a fragmentary enlarged plan sectional view of the apparatus taken on the line 9—9 of FIG. 5.

The vertical bars 36 and 40 of the panel holders 38 and 42, respectively, are secured by bolts 47 to a pair of vertical outer tubular members 48 and the vertical bars 37 and 41 of the panel holders are secured by bolts 47 to vertical member 49 (FIGS. 5 and 9). At their upper and lower ends the vertical members 48 and 49 are connected together by a pair of horizontal cross members 50 to form a carrier 51 for supporting the panel holders 38 and 42. Channel-shaped ways 52 secured to the vertical members 49 of the carrier 51 are mounted slidably in a pair of vertically disposed rails 53 FIGS. 4 and 9) for guiding the carrier 51 and the panels 21 for vertical movement.

Figure 6:
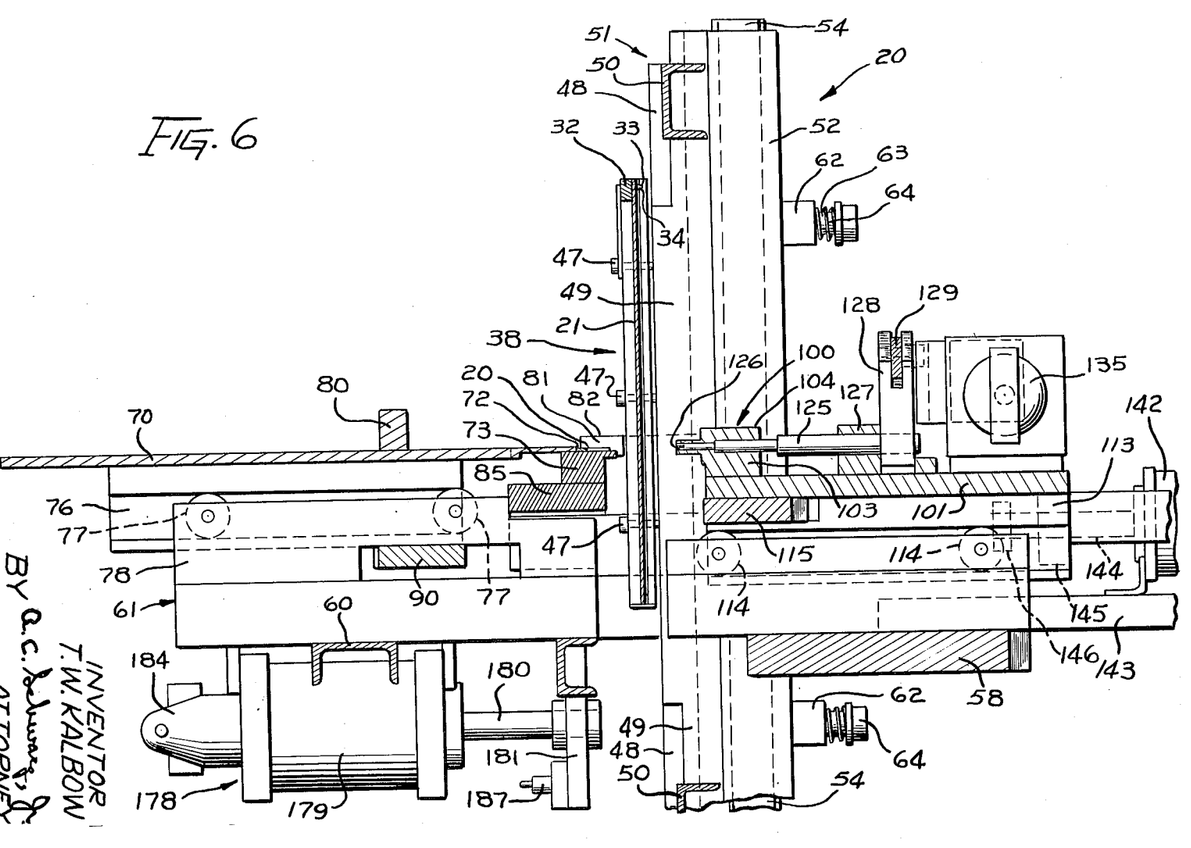
FIG. 6 is an enlarged fragmentary vertical longitudinal sectional view of the apparatus taken along line 6—6 of FIG. 4.
Figure 7:
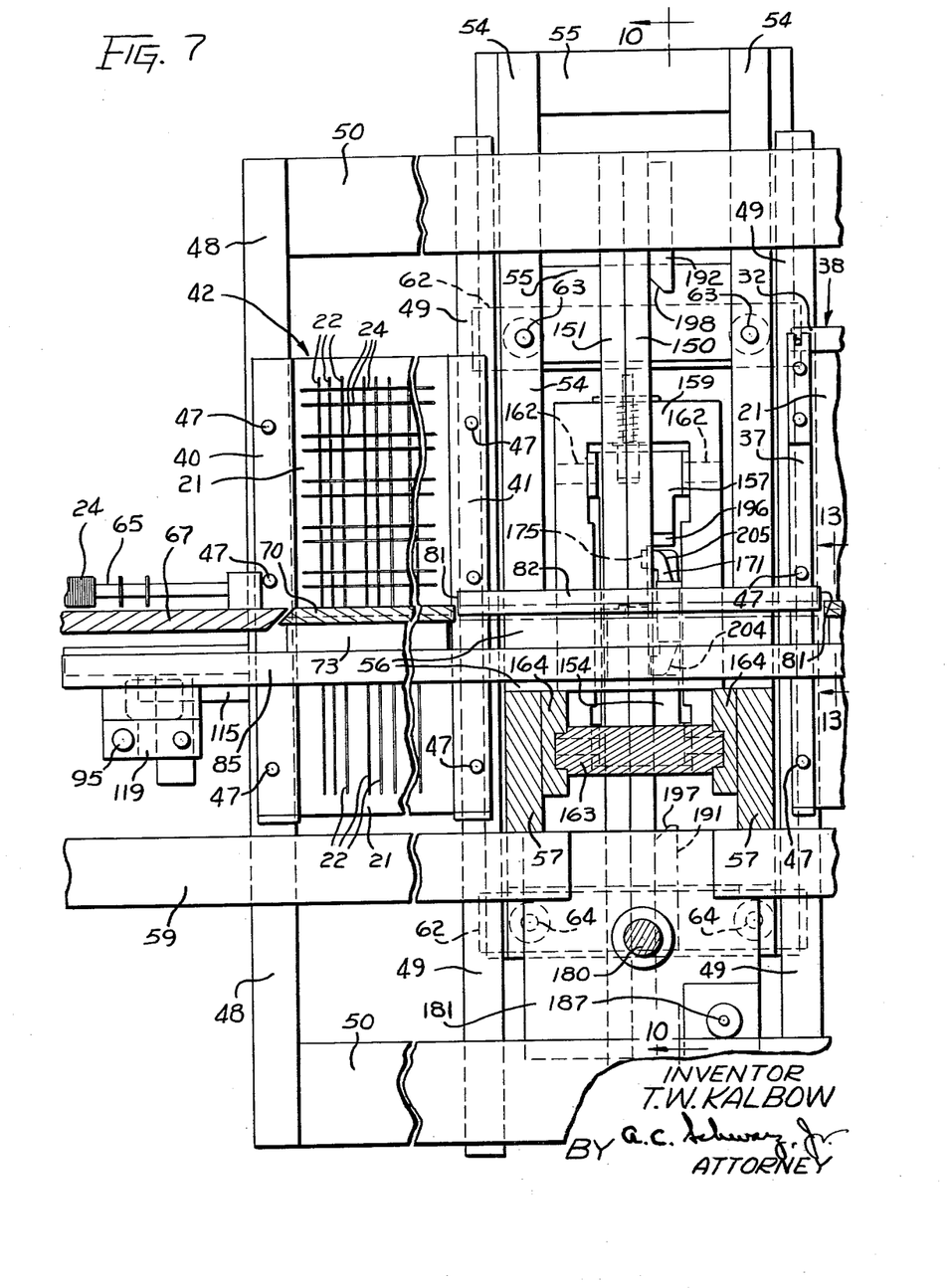
FIGS. 7 and 8 are enlarged fragmentary vertical cross-sectional views taken along lines 7—7 and 8—8, respectively, of FIG. 4.
Figure 8:
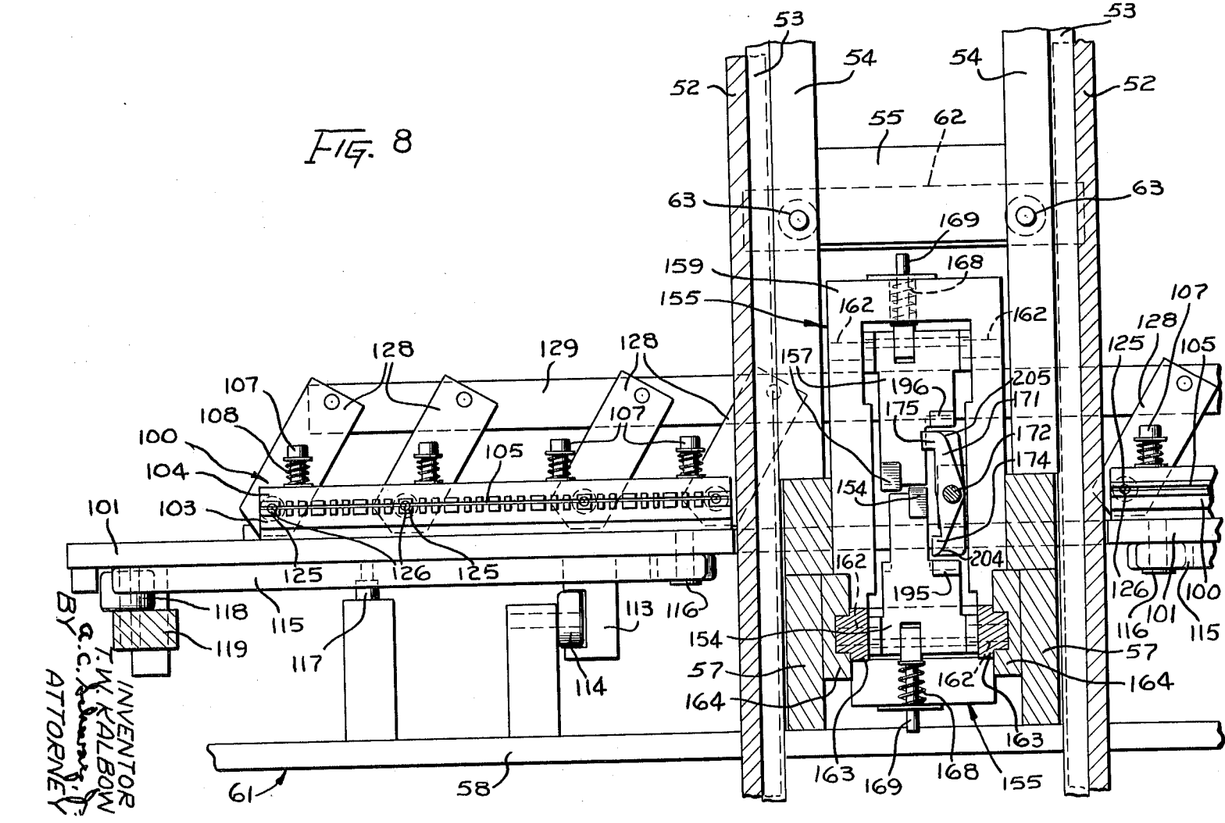
Figure 10:
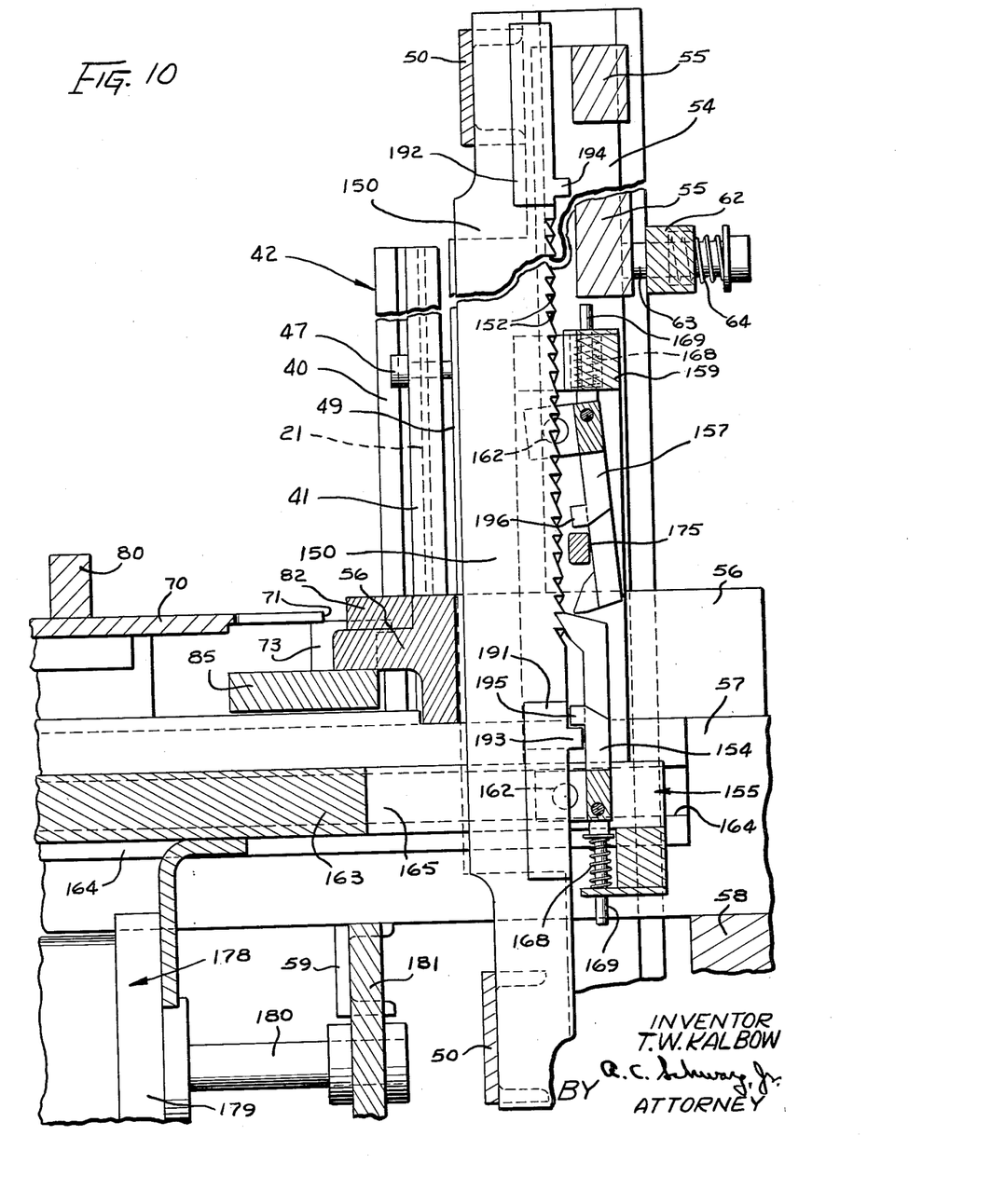
FIG. 10 is a fragmentary vertical sectional view of the apparatus taken on line 10—10 of FIG. 7 and showing the carrier indexing mechanism in one position.

The rails 53 extend laterally from and form portions of vertically disposed stationary frame members 54 which are connected together at intervals by cross members 55. At an intermediate portion thereof the vertical frame members 54 are connected to and are formed integral with a horizontally disposed U-shaped member 56 (FIGS. 9 and 10) which in turn rests on and is secured to a pair of horizontally disposed longitudinally directed frame members 57 (FIGS. 7 and 10). The frame members 57 rest on and are secured to a plurality of transversely disposed frame members including a plate 58 and channel members 59 and 60 (FIG. 6) which cooperate with the members 57 to form a horizontal frame work 61 for supporting the components of the apparatus. A plurality of legs extend downwardly from the frame work 61 to support the apparatus at a desired elevation.

As shown in FIGS. 4 and 6 to 10, a pair of bars 62 are mounted on headed screws 63 on the vertical frame members 54 and are urged by springs 64 into engagement with the channel-shaped ways 52 to yieldably hold the carrier 51 on the frame members 54 in the various vertical positions to which the carrier is indexed.

Figure 4:
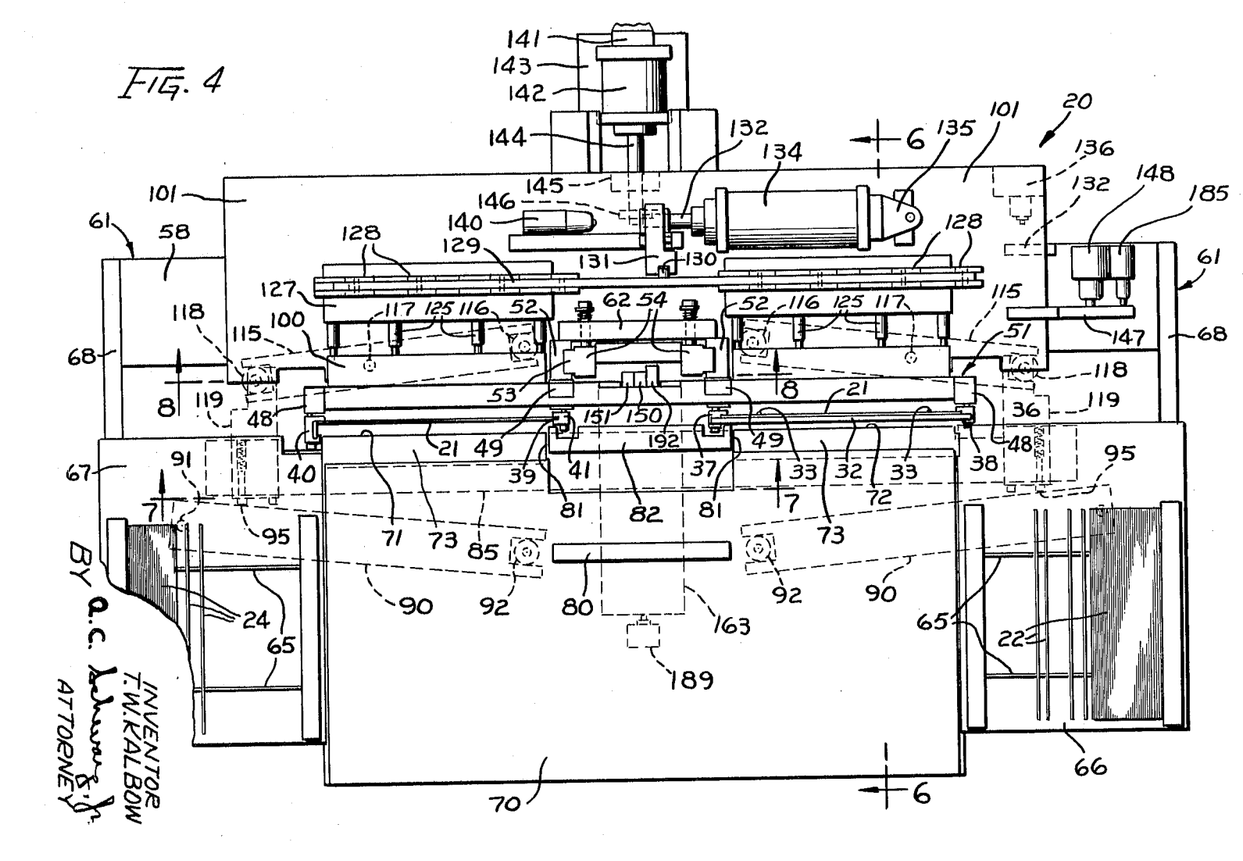
FIG. 4 is a plan view of the assembling apparatus embodying the present invention.
Figure 5:
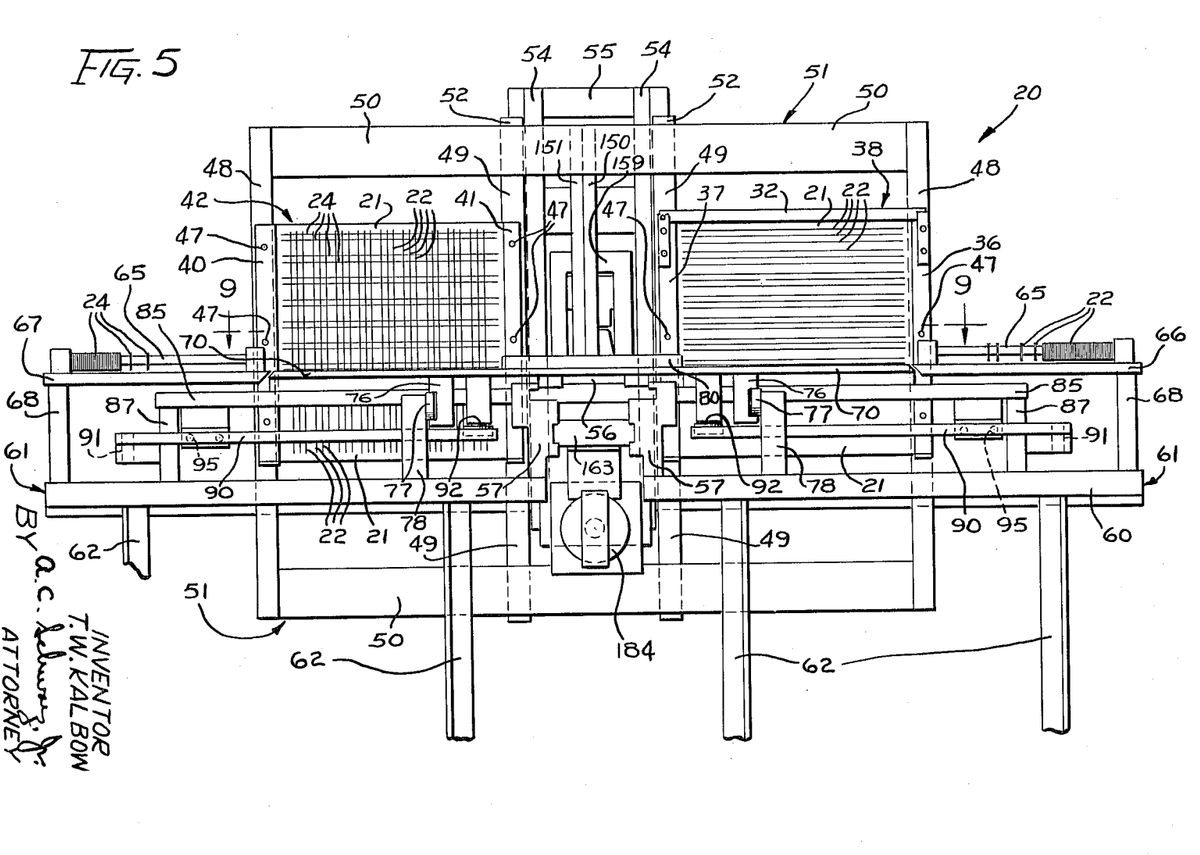
FIG. 5 is a front elevational view of the apparatus.

A supply of the bus bars 22 are supported on a rack or magazine 65 on a table 66 located on the right-hand side of the apparatus as viewed in FIGS. 4 and 5, and a supply of the bus bars 24 are supported on a rack 65 on a table 67 located on the left-hand side of the apparatus. The tables 66 and 67 are mounted fixedly on frame members 68 (FIG. 5) extending upwardly from the horizontal frame 61.

The bus bars 22 and 24 are taken from the racks 65 and placed onto a horizontally disposed pusher plate 70 (FIGS. 4 to 6) positioned in front of the carrier 50 and between the tables 66 and 67. The bus bars are guided manually toward the panels 21 in the panel holders 38 and 42 and slid off of the forward edges 71 and 72 of the pusher plate onto a pair of horizontal surfaces of gage members 73 and are supported thereby adjacent to the panels 21, 21 at a predetermined elevation in horizontal alignment with rows of apertures 28 in the panels 21. The plate 70 is supported for horizontal movement toward and away from the carrier 50 and the panels 21 thereon and has a pair of channel-shaped ways 76 (FIGS. 5 and 6) secured to the underside thereof which ride on roller 77 mounted on supporting member 78 extending upwardly from the main frame 61. A handle bar 80 is mounted on the upper surface of the pusher plate 70 by means of which the plate may be manually pushed toward the carrier 51.

After the bus bars have been slid off of the pusher plate 70 onto the gage members 73 with the tines 25 directed toward the panels, the bus bars are manually moved longitudinally toward each other into engagement with vertical positioning surfaces 81 on the end of a stationary gage member 82 (FIGS. 4 and 9) to align the tines 25 of the bus bars with the apertures 26 in the panels 21. The pusher plate 70 is then manually advanced to move the bus bars into engagement with the panels 21 and effect the insertion of the tines 25 and 27 into the recesses 26 and 28, respectively, of the panels. The gage member 82 is fixedly mounted on the frame member 56.

As shown particularly in FIGS. 4 to 7, the gage members 73, for supporting the bus bars during their assembly to the panels 21, are mounted on a gage bar 85 which is supported for horizontal movement toward and away from the carrier 51 on horizontal frame members 87 extending upwardly from the frame work 61 (FIG. 5).

Mechanism is provided for moving the gage bar 85 and the bus bars thereon toward the panels 21 as the pusher plate 70 is advanced toward the panels to facilitate assembly of the bus bars 22, 24 onto the panels 21. For this purpose a pair of levers 90 (FIGS. 4 and 5) are each pivotally supported at one end for movement about a fixed pivot 91 on the frame 61 and pivotally connected at the other end through a slot and roller connection 92 to the pusher plate 70. Intermediate their ends the levers 90 engage spring loaded pins 95 yieldably mounted on the gage bar 85 for imparting movement to the gage bar toward the panels 21 as the pusher plate 70 is moved toward the carrier 51 and the panels 21 therein.

A pair of composite back-up members 100 (FIGS. 4, 6, 8 and 13) are mounted on a horizontally disposed movable table 101 on the other side of the carrier 51 for movement into engagement with the panels 21 during the assembling of the bus bars thereto. Each of the composite back-up members 100 comprises a bar 103 secured to the plate 100 and a bar 104 superposed on the bar 103 and cooperating therewith to form a slot 105 therebetween along one side thereof into which the tines 25 of the bus bars 22, 24 enter and are maintained in horizontal alignment with each other as they are pushed through the apertures 26 of the panels 21.

Headed screws 107 (FIG. 8) extending upwardly from the lower bar 103 through apertures in the upper bar 104, and springs 108 hold the bar 104 in position.

The movable table 101 has a pair of channel-shaped ways 113 (FIG. 6) secured to the lower side thereof which cooperate with rollers 114 suitably mounted on the plate 58 of the frame 61 for supporting the table 101 for horizontal movement toward and from the panels 21. A pair of levers 115 (FIG. 4) each pivotally connected at one end to the movable plate 101 by slot and roller connections 116 are pivotally supported about fixed pivots 117 on the frame 61 and are pivotally connected through pin and slot connections 118 to laterally projecting arms 119 on the ends of the gage bar 85. The arrangement of the levers 90, 115 and gage bar 85 is such that in response to forward movement of the pusher plate 70, the gage bar 85 moves therewith at a slower rate in one direction toward the panels 21, and the movable table 101 is moved in the opposite direction to carry the back-up members 100 into engagement with the panels 21.

A plurality of twisting tools 125 having slots 126 in the ends thereof are rotatably supported in the back-up members 100 and in bearing members 127 on the movable table 101 (FIGS. 1 and 6) in alignment with the short tines 27 for movement into engagement therewith. Levers 128 secured to the tools 125 (FIGS. 6 and 8) are interconnected for simultaneous actuation by a rod 129 which in turn is connected through a pin and slot connection 130 to a crosshead 131 (FIG. 4) for actuation thereby. This crosshead is secured to a piston rod 132 of a fluid-operated actuator 134, mounted on the movable table 101 and actuated by compressed air admitted to opposite ends thereof under control of an electrically operated valve 135.

In response to forward movement of the table 101, a switch 136 on the table (FIG. 4) is actuated by a stationary member 137 on the frame 61 to effect the operation of the actuator 134 and the forward movement of the crosshead 131. The forward movement of the crosshead 131 advances the connecting rod 129 through a predetermined stroke and imparts a turning movement to each of the twisting tools 125 through approximately 90° resulting in the twisting of the short tines 27 and the attachment of the bus bars 22, 24 to the panels 21.

At the end of its forward movement, the crosshead 131 trips a switch 140 which effects the actuation of an electrically operated valve 141 and the operation of a fluid-operated actuator 142 (FIG. 4) to return the table 101 to its normal retracted position. The actuator 142 is fixedly supported on an extension 143 of the frame 61, and has a reciprocable piston rod 144. The piston rod is slidable in an aperture in a block 145 secured to the movable table 101 and has a collar 146 therein engageable with the block 145 for effecting the return of the table 101 to its retracted position in response to the return movement of the piston rod 144. Through the linkage 115, 119, 95, 90 between the table 101 and the pusher plate 70, the return movement of the table 101 effects the return movement of pusher plate 70 to its normal retracted position.

At the end of the return movement of the table 101, an arm 147 (FIG. 4) on the table trips a switch 148 on the frame 61 to effect the reverse operation of the actuator 134 and the return movement of the twisting tools 125 to their normal positions.

Mechanism is provided for indexing the carrier 51 step by step to locate successive rows of apertures 26, of the panels 21 in a loading position to receive the bus bars 22 and 24. Referring to FIGS. 7, and 9 to 12, the carrier 51 has a pair of vertically disposed ratchet bars 150 and 151 which are secured at their ends to the horizontal members 50. The ratchet bars 150 and 151 are provided with teeth 152 and 153, respectively (FIGS. 10 and 11), which are disposed in spaced relation to each other corresponding to the spacing between the rows of apertures 26, 28 on the panels 21. The teeth of the ratchet bar 150 are disposed in a direction opposite to that of the teeth of the ratchet bar 151. A feed pawl 154 on a reciprocatory carriage 155 (FIG. 10) cooperates with the ratchet bar 150 for imparting upward step by step movement to the carrier 51 and a feed pawl 157 on the carriage 155 (FIG. 11) cooperates with the ratchet bar 151 for imparting downward step by step movement to the carrier 51.

The carriage 155 includes a vertically disposed yoke 159 (FIGS. 8 and 10) for supporting the pawls 154 and 157 in vertically spaced relation to each other for pivotal movement on pins 162. The yoke 159 extends upwardly from a horizontally disposed plate or slide 163 which is supported along its longitudinal edges for horizontal movement in a pair of guideways 164 fixedly secured to the members 57 of the frame 61. As shown in FIGS. 9 and 10, the slide 163 is apertured at 165 to provide clearance for the ratchet bars 150 and 151 during the reciprocation of the carriage 155. Springs 168 and rods 169 suitably supported on the carriage 155 (FIGS. 10 to 12) stress the pawls 154, 157 for pivotal movement into engagement with their respective ratchet bars.

Figure 11:
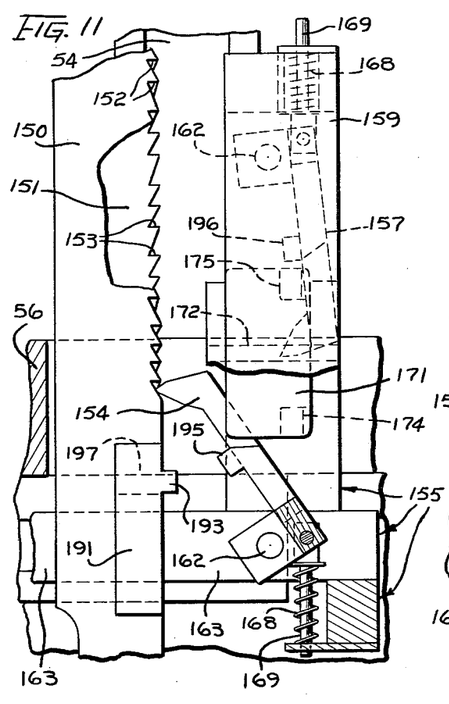
FIGS. 11 and 12 are vertical sectional views of portions of the apparatus shown in FIG. 10 and showing portions of the carrier indexing mechanism in different positions.
Figure 12:
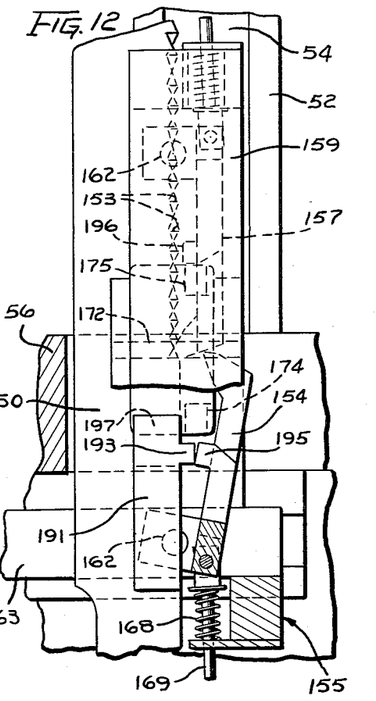
Figure 13:
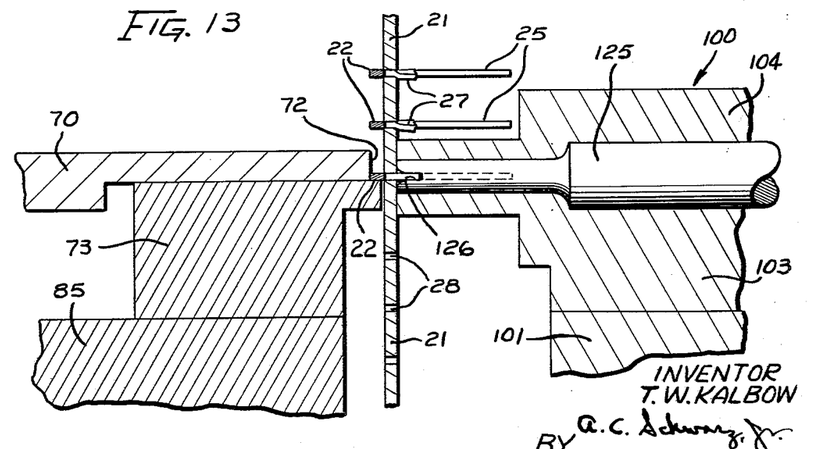
FIG. 13 is an enlarged fragmentary vertical sectional view of the apparatus taken on line 13—13 of FIG. 7 and showing a bus bar being assembled onto a panel.

A latch 171 mounted for pivotal movement about a pin 172 on the carriage yoke 159 (FIGS. 7 to 9, 11 and 12) is selectively operable for holding the feed pawl 157 in an inoperative position during the indexing movement of the carrier 51 in an upward direction (FIGS. 10 and 11) and for holding the feed pawl 154 in an inoperative position during the downward movement of the carrier 51 (FIG. 12). Extending laterally from the ends of the latch 171 is a pair of lugs 174, 175. The latch 171 is moved to a first position in which the lug 175 is adapted to hold the pawl 157 inoperative (FIGS. 8, 10 and 11) and the latch is movable to a second position in which the other lug 174 is adapted to hold the pawl 154 in inoperative position (FIG. 12).

Reciprocation is imparted to the carriage 155 by a fluid-operated actuator 178 (FIG. 10), the cylinder 179 of which is secured to the underside of the slide 163. A piston reciprocable within the cylinder has a piston rod 180 which is secured to a stationary bracket 181 on the member 59 of the frame 61. Compressed air from the supply line is selectively admitted to opposite ends of the actuator 178 under control of an electrically operated valve 184 (FIG. 6) which is electrically connected to a switch 185 (FIG. 4). This switch is mounted on the frame 61 for actuation by the arm 147 on the movable table 101 and is tripped in response to the return movement of the table to its retracted position to effect the operation of the actuator 178 and the forward movement of the cylinder 179 and the carriage 155 through a predetermined distance.

With the indexing mechanism of the apparatus conditioned to move the carrier 51 upward during the assembly of the bus bars to the panels 21, the feed pawl 154 is operative and will move to and from an upright position with the carriage 155 retracted (FIG. 10) and an oblique position with the carriage 155 advanced (FIG. 11).

With the feed pawl 154 in its upright position (FIG. 10) the upper end of the pawl is disposed in substantially vertical alignment with the pivot pin 162 and cooperates with the teeth 152 of the ratchet bar 150 to support the carrier 51 and the panels 21 thereon in predetermined loading positions to align the horizontal rows of apertures 26 in the panels 21 with the upper horizontal surfaces of the gage member 73 and the bus bars 22, 24 supported thereon. The horizontal stroke of the carriage 155 is such as to move the end of the feed pawl 54 through a vertical distance greater than the longest tooth of the ratchet bars.

Thus, in response to the forward movement of the carriage 155 to its forward position (FIG. 11), the upper end of the pawl 154 is caused to move downwardly relative to the ratchet bar 150 to disengage from the lower horizontal surface of one tooth and come to rest in a position below the horizontal lower surface of the next tooth. During the return stroke of the carriage 155, the pawl 154 will engage such next tooth and raise it and the carrier 51 a predetermined distance to locate other rows of apertures 26 of the panels 21 in the loading position.

At the end of the forward stroke of the carriage 155 a switch 187 (FIG. 6) is tripped to effect the actuation of the valve 184 and the actuator 178 to return the carriage 155 to its normal retracted position during which return movement of the carriage the carrier 51 is indexed one step. The distance of indexing movement of the carrier 51 is predetermined by the length of the tooth engaged by the feed pawl and the distance between the rows of apertures in the panels 21.

During the return stroke of the carriage 155, a switch 189 (FIG. 4) is tripped to effect the operation of the valve 141 and the actuator 142 to advance the piston rod 144 and thus position the collar 146 thereon in spaced relation to the block 145 on the table 101. This renders the table 101 free to move toward the panels 21 during the assembling of the next pair of bus bars 22, 24 onto the panels 21.

Pawl shifting members 191 and 192 secured to one side of the ratchet bar 150 adjacent to the lower and the upper ends thereof (FIGS. 7 and 10) have laterally projecting lugs 193 and 194 which cooperate with laterally projecting lugs 195 and 196 on the feed pawls 154 and 157 for moving the feed pawls individually to inoperative positions. The pawl shifting members 191 and 192 also have inclined cam surfaces 197 and 198 (FIG. 7) which cooperate with curved or inclined cam surfaces 204 and 205, respectively, on the lower and upper end portions of the latch 171 for shifting the latch from one operative position where it holds one of the feed pawls inoperative, to a second position where it holds the other feed pawl inoperative. The shifting of the feed pawls to and from operative and inoperative position and the shifting of the latch 171 from one operative position to the other occurs after completion of the assembly of all of the bus bars onto the panels 21.

In order to condition the indexing mechanism so as to effect the reversal of direction of indexing movement of the carrier 51 the operator, on completion of the assembling of the bus bars onto the panels, will move the pusher plate 70 through two extra reciprocations. On completion of the first extra reciprocation of the pusher plate, the relationship of the pawls and the ratchet bars when the carrier 51 is being moved upward, is indicated in FIG. 10 with the pawl shifting lug 193 positioned below and in close proximity to the lug 195 on the pawl 154. In response to forward movement of the carriage 155 to the position shown in FIG. 11, on the second extra reciprocation, the upper end of the feed pawl has been disengaged from the next to the last tooth of the ratchet bar 150 and is positioned below the last tooth thereof.

During the return stroke of the carriage 155 of the second extra reciprocation, the feed pawl 154, as it returns to its upright position, engages the last tooth 152 of the ratchet bar and raises the carrier 51 upwardly a predetermined distance and brings the pawl shifting lug 193 of the carrier 51 into the path of movement of the lug 195 on the pawl 154 to block the return movement of the feed pawl 154 with the carriage 155 and cause the feed pawl 154 to be rocked about the pivot pins 162 to inoperative position disengaged from the ratchet bar 150 as shown in FIG. 12.

During this return movement of the carriage 155 to the left as viewed in FIGS. 11 and 12, and the upward movement of the carrier 51, the curved lower end portion 204 of the latch 171 is carried into the path of the latch shifting member 191 on the carrier 51 and is engaged by the cam surface 204 thereon and is shifted pivotally about the pin 172 from one operative position to the other. Movement of the latch 171 to its other position moves the pawl holding lug 174 in front of the pawl 154 to hold this pawl in inoperative position and also moves the pawl holding lug 175 from the pawl 157, thereby releasing the pawl 157 and effecting the movement thereof into operative engagement with the ratchet bar 151. The indexing mechanism of the apparatus is now in condition to index the carrier 51 downwardly.

The operator may now remove the panel 21 with the two series of bus bars 22 and 24 thereon from the panel holder 42 of the carrier 51. Next the operator may remove the panel 21 with the bus bars 22 assembled thereon from the panel holder 38 and turn the panel through 90° and load it onto the panel carrier 42. A panel 21 with no bus bars thereon is then loaded onto the panel carrier 38. The operator then actuates the pusher plate 70 twice to effect two indexing movements of the carriage downwardly to locate the panels 21 in position for the assembly of the first pair of bus bars thereto.

The operator may then transfer successive bus bars 22 and 24 from their respective magazines to the proper positions on the apparatus and then actuate the apparatus to effect the assembly and securement of the bus bars to the panels as described hereinbefore.

For every third assembling cycle no bus bar 24 will be assembled onto the panel 21 in the panel holder 42 while a bus bar 22 is being assembled to the panel 21 in the panel holder 38. It will be understood that the indexing mechanism operates to accurately locate successive rows of perforations 26 of the panels in the loading position in either an upward or a downward direction and that the indexing mechanism is automatically reversed at the end of each upward and each downward movement of the carrier.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an assembling apparatus, a carrier for vertically supporting a panel having a plurality of horizontal rows of perforations therein, mounting means for supporting said carrier for vertical movement, a gage member supported on said mounting means on one side of said carrier for horizontal movement toward said carrier and having an upper surface for supporting an article having projections thereon in horizontal alignment with a row of the perforations of the panel in said carrier, a pusher element supported on said mounting means for horizontal movemenet toward said carrier for pushing the article from said gage member into assembled relation with the panel and with the projections extending through the perforations of the panel, means for moving said pusher element, means operable in response to the movement of the pusher element toward the carrier for moving said gage member toward said carrier, and means for indexing said carrier to align successive rows of apertures of the panel with the upper surface of said gage member.

2. In an apparatus for assembling bus bars having tines thereon to a perforated panel, mounting means, a holder on said mounting means for supporting a panel in a vertical position with a row of the perforations disposed horizontally, a gage member supported on said mounting means on one side of said holder and the panel therein for horizontal movement toward the holder and having a horizontal surface for supporting the bus bar in horizontal alignment with the row of perforations in the panel, a pusher element supported on said mounting means on said one side of said carrier for horizontal movement toward said holder for pushing the bus bar from said gage member into assembled relation with the panel and with the tines extending through the perforations of the panel, means for moving said pusher element, a back-up member supported on said mounting means on the other side of said holder for horizontal movement toward said holder and into engagement with the panel therein, and means interconnecting said pusher element, said gage member and said back-up member for moving said gage member and said back-up member toward said holder and the panel therein in response to movement of said pusher element toward said carrier.

3. In an assembling apparatus, a carrier for supporting a panel having a plurality of horizontal rows of perforations therein, mounting means for supporting said carrier for vertical movement, a first gage member supported on said mounting means on one side of said carrier for horizontal movement toward said carrier and having an upper surface for supporting a bus bar with tines thereon in horizontal alignment with a row of the perforations in the panel, a second gage member fixedly supported on said mounting means and having a vertical surface engageable with an end of the bus bar on said first gage member for locating the tines of the bus bar in alignment with the apertures of the panel, a pusher element supported on said mounting means on said one side of said carrier for horizontal movement toward said carrier for pushing the bus bar from said first gage member into assembled relation with the panel and with the tines extending through the perforations of the panel, means for moving said pusher element, a back-up member supported on said mounting means on the other side of said carrier for horizontal movement toward the carrier and into engagement with the panel therein, means interconnecting said pusher element, said first gage member and said back-up member for moving said first gage member and said back-up member toward said carrier and the panel therein in response to movement of said pusher element toward said carrier, and means for indexing said carrier to align successive rows of apertures of the panel with the upper surface of said gage element.

4. In an apparatus for assembling bus bars having tines thereon to a panel having a row of perforations thereon, mounting means, a holder on said mounting means for supporting a panel in a vertical position with a row of the perforations disposed horizontally, a gage member supported on said mounting means on one side of said holder and the panel therein for horizontal movement toward the holder and having a horizontal surface for supporting a bus bar in horizontal alignment with the row of perforations in the panel, a horizontally disposed pusher element supported on said mounting means on said one side of said holder for horizontal movement toward said holder for pushing the bus bar from said gage member into assembled relation with the panel and with the tines extending through the perforations of the panel, means for moving said pusher element, a table supported on said mounting means on the other side of said holder for horizontal movement toward said holder and the panel therein, a back-up member mounted on said table for movement therewith into engagement with the panel, twisting tools mounted on said table for movement with said back-up member into engagement with selected tines, means interconnecting said pusher element, said gage member and said table for effecting the movement of said gage member and said table toward the panel in response to movement of said pusher element toward the panel, means on said table operable in response to movement of said back-up member into engagement with said panel for turning said tools to effect the twisting of the selected tines, and means for moving said table from said panel to effect the return movement of said table, said pusher element and said gage member to retracted positions.

5. In an apparatus for assembling bus bars having tines thereon to a panel having rows of perforations therein, a carrier for supporting a panel in a vertical position with the rows of the perforations disposed horizontally, mounting means for supporting said carrier for vertical movement, a gage member supported on said mounting means on one side of said holder and having a horizontal surface for supporting the bus bar in horizontal alignment with the row of perforations in the panel, a pusher element supported on said mounting means on one side of said carrier for horizontal movement for pushing the bus bar from said gage member into assembled relation with the panel and with the tines extending through the perforations of the panel, means for moving said pusher element toward said holder, a table supported on said mounting means on the other side of said carrier for horizontal movement toward the carrier and the panel therein, a back-up member on said table movable therewith into engagement with the panel, twisting tools mounted on said table for movement therewith into engagement with selected tines of the bus bar, means interconnecting said pusher element and said table for moving said table toward said carrier in response to movement of said pusher element toward said carrier to effect the movement of said back-up member and said tools into engagement with the panel and the tines respectively, means on said table operable in response to movement of said twisting tools into engagement with the tines for turning said tools to effect the twisting of the tines, means operable in response to the twisting of the tines for moving said table and said pusher element from said carrier to retracted positions, and means for indexing said carrier vertically in response to movement of said table to retracted position.

6. In an assembling apparatus, a carrier for supporting an article, mounting means for supporting the carrier for movement along a predetermined path, a slide supported on said mounting means for movement transversely of said path, a ratchet bar mounted on said carirer parallel to said path and having teeth thereon of different lengths, a feed pawl having an end thereof engageable with said teeth, means for mounting said pawl on said slide for pivotal movement about an axis, means for urging said pawl for pivotal movement into engagement with said ratchet bar, and means for reciprocating said slide through a predetermined stroke to move said feed pawl to and from a first position with said end of the pawl and said axis in a plane substantially parallel to said ratchet bar and a second position with said end of the feed pawl and said axis in a plane disposed obliquely to said ratchet bar to cause said end of the pawl to move parallel to said path through a distance greater than the longest tooth of said ratchet bar.

7. In an apparatus of the type described, a carrier for supporting an article, mounting means for supporting the carrier for reciprocatory movement along a predetermined path, a slide supported on said mounting means for reciprocatory movement transversely of said path, a first ratchet bar mounted on said carrier parallel to said path and having teeth thereon disposed in one direction, a first pawl mounted pivotally on said slide and stressed for movement into engagement with said first ratchet bar, a second ratchet bar mounted on said carrier parallel to said path having teeth thereon disposed in the opposite direction, a second feed pawl mounted pivotally on said slide and stressed for pivotal movement into engagement with said second ratchet bar, a latch mounted on said slide for movement therewith and for pivotal movement relative thereto to a first position and a second position, said latch being operable in said first position for holding said first pawl in an inoperative position on said slide in spaced relation to said first ratchet bar and said latch being operable in said second position for holding said second feed pawl in an inoperative position on said slide in spaced relation to said second ratchet bar, cooperable means on said carrier and on said first pawl for effecting the movement of said first pawl from said first ratchet bar to said inoperative position on said slide in response to reciprocation of said slide when said carrier has moved to a predetermined position in one direction, cooperable means on said carrier and said second pawl for disengaging said second pawl from said second ratchet bar and moving it to an inoperative position on said slide in response to reciprocation of said slide when said carrier has been moved to a predetermined position in the opposite direction, means on said carrier engageable with the latch in response to movement of said carrier to said predetermined position in said one direction for effecting the movement of said latch to said first position on said slide to release said second pawl and to hold said first pawl in said inoperative position, and means on said carrier operable in response to movement of said carrier to a predetermined position in the opposite direction for moving said latch to the second position on said slide to release said first pawl and to hold said second pawl in said inoperative position.

8. In an assembling apparatus, a carrier for supporting an article, mounting means for supporting the carrier for reciprocatory movement along a predetermined path, a slide supported on said mounting means for reciprocatory movement transversely of said path, a first ratchet bar mounted on said carrier parallel to said path having teeth of different lengths thereon directed toward one end of said ratchet bar, a second ratchet bar mounted on said carrier parallel to said path having teeth in spaced relation to each other corresponding to the spacing of the teeth on said first ratchet bar and directed toward the other end of said first ratchet bar, a first pawl and a second pawl mounted pivotally on said slide for movement therewith and for pivotal movement relative thereto into engagement with the teeth of said first ratchet bar and said second ratchet bar respectively, means for urging said pawls individually for pivotal movement from an inoperative condition spaced from said ratchet bars to an operative condition in engagement with said ratchet bars, means for shifting said pawls individually from said operative condition to said inoperative condition on said slide, a latch mounted on said slide for movement therewith and for movement relative thereto to a first position and a second position, said latch being operable in said first position for releasing said first pawl and for holding said second pawl in inoperative condition and being operable in said second position for releasing said second pawl and holding said first pawl in inoperative condition, means for shifting said latch to and from said first and second positions, and means for reciprocating said slide through a predetermined stroke to move said operative pawl to and from an advanced position with said operative pawl disposed substantially parallel to said ratchet bars and a retracted position with said operative pawl disposed obliquely to said ratchet bars to effect the movement of said end of the operative pawl along the ratchet bar associated therewith through a predetermined distance greater than the length of the longest tooth of said ratchet bars.

9. In an assembling apparatus, a carrier for supporting an article, mounting means for supporting the carrier for vertical reciprocatory movement, a slide supported on said mounting means for horizontal reciprocatory movement, a first vertically disposed ratchet bar mounted on said carrier having downwardly directed teeth for different lengths thereon, a second vertically disposed ratchet bar on said carrier having upwardly directed teeth in spaced relation to each other corresponding to the spacing of the teeth on said first ratchet bar, a first feed pawl and a second feed pawl mounted pivotally on said slide for horizontal movement therewith and for pivotal movement relative thereto into engagement with the teeth of said first ratchet bar and said second ratchet bar respectively, means on said slide for urging said pawls individually for pivotal movement from an inoperative condition spaced from said ratchet bars to an operative condition in engagement with said ratchet bars, a pawl shifting lug on each of said pawls, a first pawl shifting lug mounted on said carrier adjacent the lower extremity of said ratchet bars operable when said carrier has been elevated to a predetermined upper position for intercepting the lug on said first pawl during the horizontal reciprocation of said slide to effect the disengagement of said first feed pawl from said first ratchet bar and the movement of the first feed pawl to inoperative position, a second pawl shifting lug on said carrier adjacent the upper extremity of said ratchet bars operable in response to the downward movement of the carrier to a predetermined lower position for intercepting said lug on said second feed pawl during the reciprocation of said slide to effect the disengagement of said second feed pawl from said second ratchet bar and the movement of said second feed pawl to inoperative position, a latch mounted on said carrier for pivotal movement to and from a first position for releasing said second feed pawl and holding said first feed pawl in said inoperative position and a second position for releasing said first feed pawl and for holding said second feed pawl in inoperative position, means on said carrier adjacent the lower end of said ratchet bar for shifting said latch to said first position on said slide in response to upward movement of said carrier to said upper position, means on said carrier adjacent the upper end of said ratchet bars for shifting said latch to said second position in response to downward movement of said carrier to said lower position, and means for reciprocating said slide through a predetermined stroke to move said operative pawl to and from an advanced position with said operative pawl disposed substantially vertically and a retracted position with said operative pawl disposed obliquely to effect the movement of the extremity of said operative pawl along the ratchet bar associated therewith through a predetermined distance greater than the length of the longest tooth of said ratchet bar.

No references cited.